United States Patent [19]

Sadler et al.

[11] Patent Number: 5,035,586

[45] Date of Patent: Jul. 30, 1991

[54] PORTABLE HAND-HELD BLOWER/VACUUM UNIT WITH RESILIENT ENGINE MOUNTING SYSTEM

[75] Inventors: Jeffery G. Sadler; Lloyd H. Tuggle; Imack L. Collins, all of Shreveport, La.

[73] Assignee: White Consolidated Industries, Inc., Cleveland, Ohio

[21] Appl. No.: 340,449

[22] Filed: Apr. 19, 1989

[51] Int. Cl.⁵ .......................... F04B 17/00; A47L 5/24
[52] U.S. Cl. .................................. 417/363; 417/364; 417/423.6; 417/423.7; 417/423.14; 15/344; 15/405; 15/412
[58] Field of Search .......................... 15/344, 405, 412; 123/192 R, 198 E; 180/299; 181/204; 417/363, 364, 423.1, 423.6, 423.7, 423.14; 55/507, 509, 508, 510

[56] References Cited

U.S. PATENT DOCUMENTS

| | | | |
|---|---|---|---|
| 2,538,954 | 1/1951 | Ebromson et al. | 248/358 |
| 2,875,466 | 6/1955 | Nyberg | 417/363 |
| 2,894,489 | 7/1959 | Clay | 121/36 |
| 3,139,152 | 6/1964 | Bajer | 180/64 |
| 3,224,473 | 12/1965 | Dobbertin et al. | 143/32 |
| 3,372,718 | 3/1968 | Irgens | 143/32 |
| 3,530,909 | 9/1970 | Scharpf | 143/32 |
| 3,637,029 | 1/1972 | Sherwood, Jr. et al. | 173/162 |
| 3,680,608 | 8/1972 | Emmerich et al. | 143/32 |
| 4,135,301 | 1/1979 | Hoeppner | 30/381 |
| 4,198,752 | 4/1980 | Bross | 30/381 |
| 4,641,055 | 7/1984 | Zerker et al. | 15/344 |
| 4,644,606 | 2/1987 | Luerken et al. | 15/344 |
| 4,674,146 | 6/1987 | Tuggle et al. | 15/344 |
| 4,746,274 | 5/1988 | Kiyooka et al. | 417/364 |
| 4,824,333 | 4/1989 | Erickson, Jr. | 417/423.2 |
| 4,884,314 | 12/1989 | Miner et al. | 15/344 |

*Primary Examiner*—Leonard E. Smith
*Assistant Examiner*—John A. Savio, III
*Attorney, Agent, or Firm*—Hubbard, Thurman, Tucker & Harris

[57] ABSTRACT

A portable, hand-held blower/vacuum unit has a housing structure defined by an upper engine shroud removably connected to the top wall of a lower impeller housing. Disposed within the shroud is a small internal combustion engine having a vertical crankshaft which extends downwardly through a depending well section formed on the top wall of the impeller housing, the lower shaft end being drivingly connected to a centrifugal fan impeller positioned within the impeller housing and operative to force a flow of ambient air therethrough. The engine is resiliently and floatingly mounted within the shroud by a resilient support system which prevents rigid contact between the engine and the shroud or the impeller housing to thereby substantially reduce engine vibration transmitted to the housing structure, and permit deflection of the engine relative to the housing structure to lessen the possiblity of engine damage caused by impeller impact from ingested objects. The engine's carburetor is disposed within a shroud wall section that defines with a fan housing portion of the engine a double-walled thermal barrier disposed between the carburetor and the engine's muffler. A resilient air filter element is interconnected between the shroud and the carburetor air inlet and flexes in response to engine deflection to thereby absorb and damp engine vibration which might otherwise be transmitted to the housing structure through the carburetor.

16 Claims, 4 Drawing Sheets

PORTABLE HAND-HELD BLOWER/VACUUM UNIT WITH RESILIENT ENGINE MOUNTING SYSTEM

BACKGROUND OF THE INVENTION

The present invention relates generally to air moving apparatus, and more particularly to portable, hand-held, engine-driven blower/vacuum units used, for example, to blow away or vacuum up ground debris such as leaves, grass clippings, dust and the like.

Blower/vacuum units of this general type typically comprise a small internal combustion engine (or an electric motor) disposed within an upper portion of a hand-held housing structure having a lower end chamber in which a fan impeller is positioned and drivingly connected to the engine for rotation thereby. Rotation of the impeller draws air through an inlet opening into the lower end chamber and forces it outwardly through an elongated discharge tube, the discharged air being used to blow away the aforementioned ground debris when the unit is in its blower mode. Alternatively, a vacuum inlet tube may be secured to the inlet of the lower end chamber, and a vacuum outlet tube interconnected between the chamber outlet and a suitable vacuum bag, to suck up ground debris or the like when the unit is appropriately converted to its available vacuum mode.

While conventional blower/vacuum units of this type typically perform their air moving functions quite well, they are normally subject to two well known problems—the transmission of considerable engine vibration to the unit operator through the housing structure, and potential drive shaft and shaft bearing damage caused by impeller impact forces created by ingestion of hard objects (such as pebbles or the like) into the impeller chamber. These impact forces are particularly severe when an ingested object becomes suddenly wedged between the impeller and a portion of the housing structure which defines the impeller chamber.

A conventional approach to lessening engine vibration transmitted to the operator is to mount the operator carrying handle to the housing structure by means of resilient damping members designed to isolate the handle from engine vibration transmitted to the housing structure. While this approach lessens the engine vibration transmitted to the operator's hand, it is often the case that the handle damping structure still permits an unacceptably high level of vibration to pass therethrough, thereby fatiguing the operator's hand within a relatively short period of unit operation.

In an attempt to solve the second problem—impeller impact by ingested objects—a variety of apertured guard structures have been positioned over the impeller inlet opening to prevent the ingestion of relatively heavy, ground-disposed objects such as pebbles when the unit is in its blower mode and the impeller chamber inlet is placed near the ground. However, if the guard apertures are made sufficiently small to prevent ingestion of pebbles and the like, they are likely to become readily clogged by leaves, grass clippings and the like. On the other hand, if the apertures are made larger to alleviate this clogging problem, the likelihood that pebbles and other hard objects will be ingested is increased. This ingestion problem is, of course, also present when the unit is in its vacuum mode.

In view of the foregoing, it is a primary object of the present invention to provide a portable, hand-held, engine driven blower/vacuum unit in which the above-mentioned and other problems and disadvantages associated with conventional units of this general type are eliminated or at least significantly reduced.

SUMMARY OF THE INVENTION

In carrying out principles of the present invention, in accordance with a preferred embodiment thereof, a portable, handheld, internal combustion engine-driven blower/vacuum unit is provided which comprises an upper engine shroud having an operator carrying handle resiliently secured to its upper end, and an open bottom end portion removably secured to the top wall of a lower impeller housing having a bottom inlet opening and a front side discharge opening.

A small internal combustion engine is disposed within the shroud and has a vertically oriented, cantilevered crankshaft with a lower power output end portion projecting downwardly through a bottom end opening formed in a depending well section on the top impeller housing wall. The lower end of the shaft is drivingly and removably connected to a centrifugal fan impeller disposed within the impeller housing and rotatable about the vertical shaft axis to flow air into the impeller housing through its inlet opening and outwardly through its discharge opening.

A bottom cover member is pivotally secured to the impeller housing for movement between first and second positions relative thereto. In its first position, the cover member extends across the impeller housing inlet in a spaced relationship therewith, and defines an annular air inlet passage which is positioned to inhibit the entrainment of relatively heavy, ground-disposed objects such as pebbles and the like into the impeller housing when its inlet is positioned closely adjacent the ground. In its second position, the bottom cover member is swung outwardly from the impeller housing inlet to permit a vacuum inlet tube to be operatively secured thereto when the unit it in its vacuum mode.

The engine also includes a horizontally disposed cylinder positioned forwardly of the upper end of the crankshaft and having a horizontally reciprocable piston therein which is operatively secured to the upper end of the crankshaft to rotationally drive it. At its rear end, the cylinder is operatively secured to a crankcase within which the upper crankshaft end is disposed. A muffler is operatively secured to the upper side of the cylinder to receive hot exhaust gas discharged therefrom during engine operation. The muffler has a discharge end projecting outwardly through a suitable opening formed in the front side of the shroud and covered by a slotted muffler guard member. Directly behind the muffler, and positioned on the top end of the crankcase, is a carburetor having a lever-operated choke plate secured to its upper end.

The upper end of the crankshaft is supported by an upper bearing structure positioned above a bladed flywheel coaxially anchored to the crankshaft for rotation thereby. Immediately below the flywheel is a starter pulley portion of the engine's recoil type pull start system.

The muffler, cylinder, crankshaft, flywheel, and starter pulley portions of the engine are enveloped by an internal fan housing, the fan housing having a lower hollow hub section which circumscribes the starter pulley and projects downwardly into the well portion of the upper impeller housing wall. The fan housing hub section has an air inlet opening, and an outlet opening spaced rearwardly from the slotted muffler guard and circumscribing the muffler.

The top end wall of the engine shroud has a downwardly projecting internal well section in which the carburetor is received. This well section has an open lower end internally bounded by an inturned lip portion that circumscribes and engages a foam rubber thermal and dirt barrier element extending around a base portion of the carburetor. A front wall portion of this carburetor well section is spaced rearwardly from an upper rear side wall portion of the fan housing and defines therewith a double wall structure that thermally isolate the muffler from the carburetor. The upper end of the carburetor well section is open and has removably latched therein an access plate which engages and holds on the upper surface of the carburetor choke plate a foam rubber carburetor air filter element.

The lower end of the cantilevered crankshaft member is rotatably supported by a lower bearing structure which is retained in the lower end of the fan housing hub section, the lower bearing structure including an annular bushing which loosely circumscribes the lower crankshaft end, thereby permitting the lower end of the crankshaft to axially "float" relative to the lower bearing structure, and an annular ball bearing element which outwardly circumscribe the bushing.

During operation of the engine, the rotating bladed flywheel sequentially draws ambient cooling air inwardly through inlet slots formed in a lower portion of the shroud, and into the fan housing hub through its inlet opening, and then sequentially flows the cooling air upwardly through the fan housing, across the cylinder and muffler, and then outwardly through the fan housing outlet opening and the muffler guard for mixture with and cooling of the exhaust gas discharged forwardly from the muffler. Additionally, carburetor inlet air is drawn inwardly through the shroud slot, upwardly through the foam rubber thermal and dirt barrier into the carburetor well, and into the carburetor through the horizontal side periphery of its associated resilient air filter element.

The engine is mounted within the shroud by a unique resilient support structure having upper and lower portions. The upper portion includes a pair of post members projecting horizontally outwardly from opposite sides of the interior fan housing. The support post members are slidably received in resilient cup members that are in turn retained in outwardly projecting support well portions of opposite sides of the engine shroud positioned above the upper crankshaft end. This upper portion of the resilient support system mounts an upper portion of the engine to the shroud interior in a manner relatively freely permitting the engine to pivot about a horizontal axis generally transverse to the crankshaft axis, but resiliently resists movement of the engine with respect to the shroud in directions transverse to and parallel to such horizontal axis.

The lower portion of the resilient support system comprises an annular, resilient support member which circumscribes the lower fan housing hub section and outwardly engages the lower well portion depending from the upper impeller housing wall. The lower annular support member resiliently resists pivotal movement of the engine with respect to the shroud about the horizontal axis extending through the two upper support post members.

The engine is thus resiliently and floatingly supported within the engine shroud such that no portion of the engine is in rigid contact with either the engine shroud or the lower impeller housing. The only locations at which the engine is connected to the overall housing structure defined by the engine shroud and the impeller housing are at the resilient cup members, the resilient annular lower support member, the resiliently mounted gas tank and the resilient carburetor air filter element.

This resilient mounting of the engine significantly reduces engine operation vibration transmitted to the housing structure and thus to the unit operator. The resilient mounting system also serves to protect the engine shaft, and its bearing structure, from impact loads imposed upon the rotating impeller during unit operation. Such impact loads merely resiliently deflect, the engine relative to the housing structure and resiliently flex the carburetor inlet filter Because of the positioning of the lower crankshaft end bearing structure in the engine itself, potential impact damage to the lower crankshaft end is significantly lessened since the lower bearing structure is also resiliently deflected upon engine movement relative to the housing structure.

The use of the annular lower resilient support member permits the entire power head assembly (comprising the upper shroud and its internally disposed engine) to be rapidly removed in its entirety from the impeller housing to thereby permit ready access to the starter pulley and the balance of the recoil type pull start system of the unit. The unit may be just as rapidly reassembled by simply dropping the power head assembly into place on top of the impeller housing, reconnecting the impeller and connecting the engine shroud to the impeller housing.

DETAILED DESCRIPTION

Figure 1:
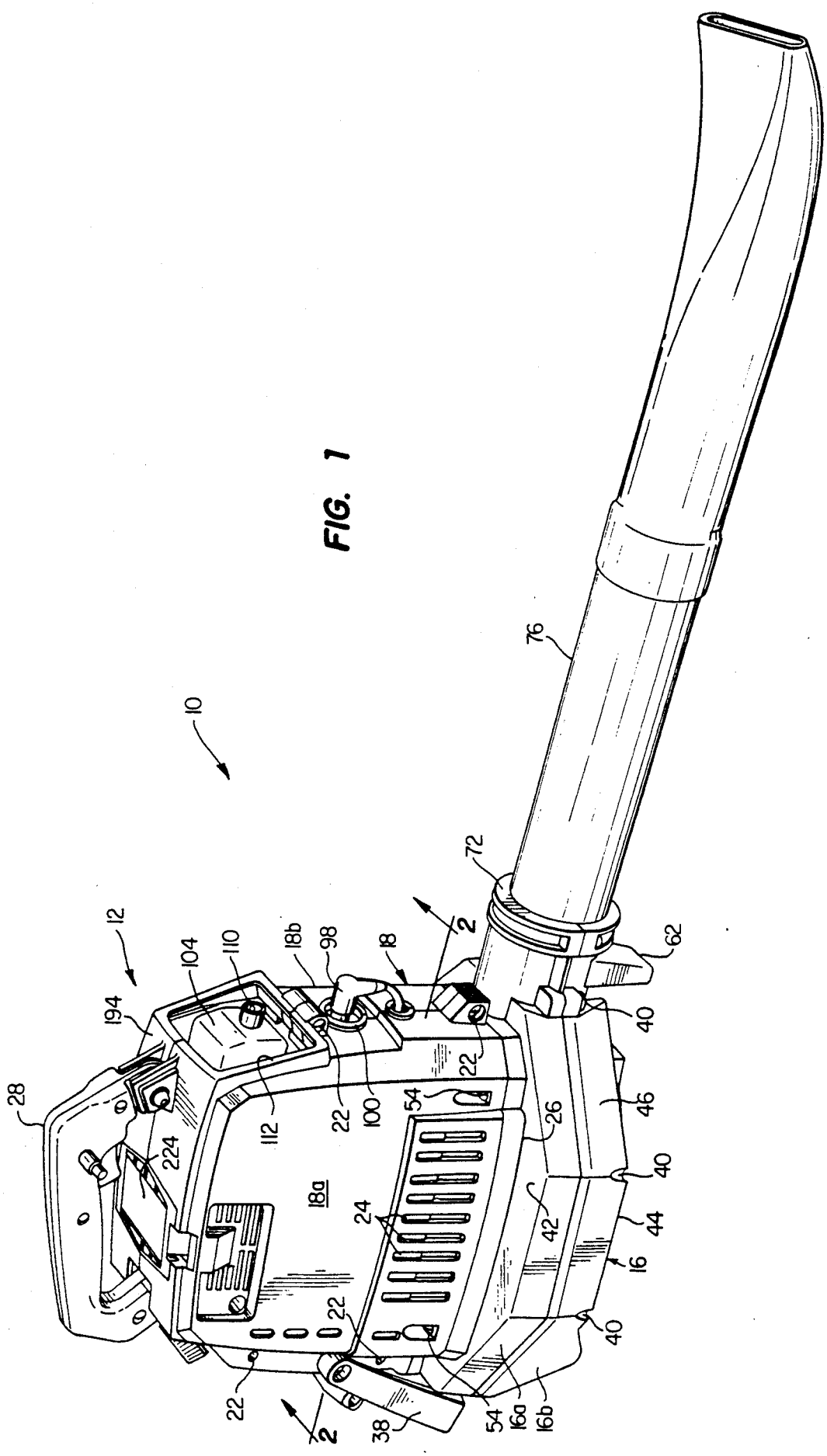
FIG. 1 is a perspective view of a hand-held portable blower/vacuum unit having incorporated therein a power head assembly embodying principles of the present invention, a muffler guard portion of the engine shroud having been removed for illustrative purposes.
Figure 2:
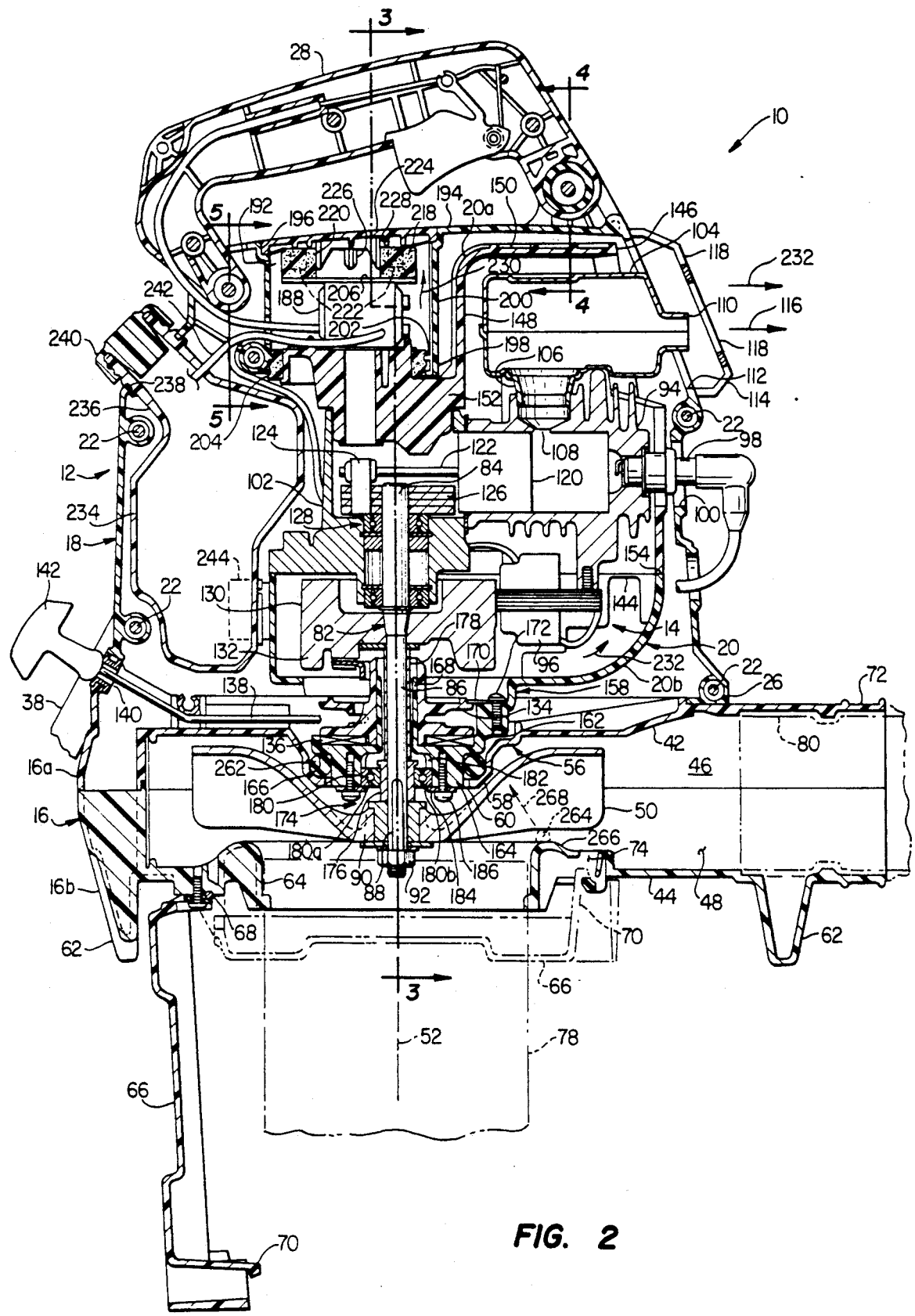
FIG. 2 is an enlarged scale partially elevational crossectional view through the power head assembly end of the unit taken along line 2—2 of FIG. 1.
Figure 3:
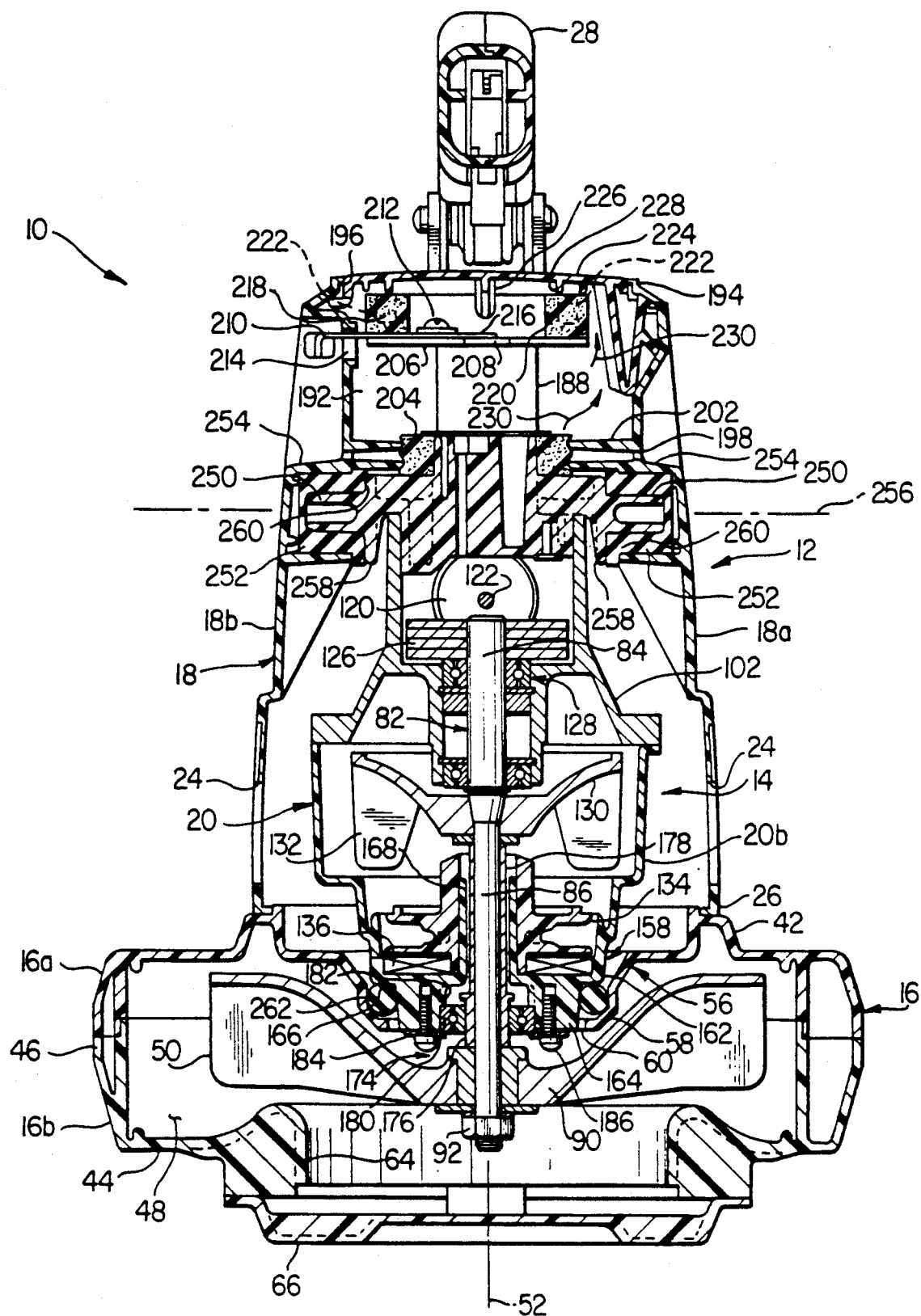
FIG. 3 is an enlarged scale partially elevational crosssection view through the power head assembly end of the unit taken along line 3—3 of FIG. 2.

Referring to FIGS. 1-3, the present invention provides a portable, hand-held blower/vacuum air moving device 10 which incorporates a uniquely constructed power head assembly 12. As subsequently described in detail, the power head assembly 12 includes a single cylinder, air cooled, two stroke cycle engine 14 resiliently mounted in a novel fashion within an interconnected housing structure comprising a lower base or impeller housing 16, an upper engine shroud 18, and an interior fan housing 20 disposed within the shroud 18.

Figure 4:
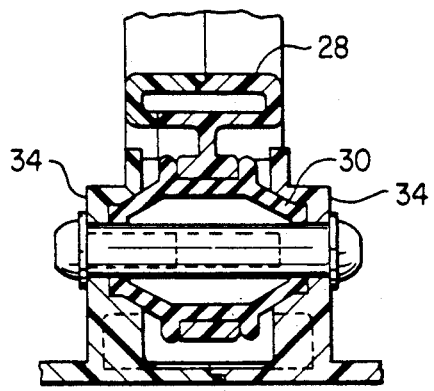
FIG. 4 is a cross-sectional view through an upper handle portion of the unit taken along line 4—4 of FIG. 2.
Figure 5:
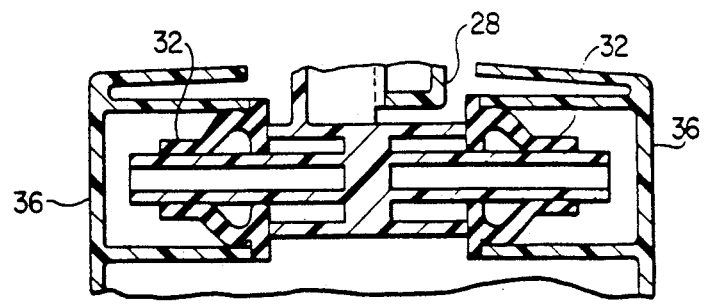
FIG. 5 is a cross-sectional view through the upper handle portion of the unit taken along line 5—5 of FIG. 2.

Shroud 18 is formed from two side-by-side molded plastic left and right half sections 18$_a$ and 18$_b$ which are removably intersecured by a series of screws 22. For purposes later described, the shroud halves 18$_a$ and 18$_b$ each have a series of air inlet slots 24 formed therethrough adjacent an open bottom end 26 of the shroud. A main operator carrying handle 28 is secured at its opposite ends to the top end of the shroud 18 by means of suitable resilient vibration damping elements 30 and 32 carried within tab portions 34 and 36 of the shroud as best illustrated in FIGS. 4 and 5. Additionally, an auxiliary operator carrying handle 38 is suitably secured to the back side of the shroud 18.

The lower impeller housing 16, to which the power head assembly 12 is operatively secured, is formed from upper and lower molded plastic half sections 16$_a$ and 16$_b$ which are removably connected to one another by a series of screws 40. Impeller housing 16 has a top wall 42, a bottom wall 44, and a vertical side wall 46 which defines with the top and bottom walls 42, 44 a lower end chamber 48 within which a bladed centrifugal impeller 50 is mounted for rotation about a drive axis 52 which, with the air moving device 10 in a normal operating position thereof, is generally vertically disposed.

The open bottom end 26 of the upper engine shroud 18 is removably secured to the top wall 16$_a$ of the impeller housing 16 by means of a series of screws 54 and is positioned over a central well portion 56 which depends from the balance of the impeller housing top wall 16. Well portion 56 has an annular, stepped side wall which, at its lower end, defines a ledge portion 58 that circumscribes a circular bottom end opening 60 of the well portion.

The bottom wall 16$_b$ of the impeller housing 16 has formed thereon a series of depending support legs 62 which permit the air moving device 10 to be rested upon the ground in a manner positioning the bottom wall 16$_b$ of the impeller housing above the ground. Formed in the bottom wall 16$_b$ of the impeller housing is a circular air inlet opening 64 across which a bottom cover member 66 extends.

The cover member 66 is pivoted to the bottom impeller housing wall 16$_b$, at point 68, for pivotal motion relative to the impeller housing between the dotted line closed position and the solid line open position depicted in FIG. 2. A suitable latch structure 70 releasably holds the cover member 66 in its closed position. An open-ended cylindrical discharge portion 72 is formed on the front side of the impeller housing 16.

With the cover member 66 in its closed position, and the air moving device 10 in its blower mode, engine-driven rotation of the impeller 50 draws ambient air into the lower end chamber 18 through an annular opening 74 defined between the cover member and the bottom air inlet opening 64, and forces the air outwardly through a blower discharge tube member 76 (FIG. 1) having an inner end portion suitably secured within the impeller housing discharge portion 72. Accordingly, an operator may hold the air moving device 10 and guide the outlet tube 76 to cause air being discharged from its outer end to blow away leaves and other debris in the usual manner. In its closed position, the bottom cover member functions as anti-entrainment means to inhibit the ingestion of solid objects into the lower end chamber 48, particularly when the engine 14 is running and the air moving device, in its blower mode, is rested on the ground on its support legs 62.

By opening the bottom cover member 66, inserting a vacuum inlet tube 78 into the bottom inlet opening 64 of the impeller housing, and inserting a vacuum outlet tube 80 (FIG. 2) into the impeller housing outlet portion 72, the air moving unit 10 may be used in its vacuum mode. In this vacuum mode, air drawn upwardly through the inlet tube 78 is flowed through the lower end chamber 48 into and through the outlet tube 80 into a suitable vacuum bag structure (not illustrated).

Referring now to FIGS. 2 and 3, the engine 14 includes a cantilevered crankshaft member 82 which extends vertically along the drive axis 52 and has an upper end portion 84 disposed within the engine shroud 18, and a lower end portion 86 having a flattened side surface portion 88. The lower crankshaft end portion 86 projects downwardly through the bottom end opening 60 in the impeller housing well 56, and extends through a central hub portion 90 of the impeller 50. A suitable retaining nut 92 is threaded onto the lower end of the crankshaft 82 to drivably mount the impeller 50 thereon.

Positioned within a front side portion of the shroud 18, just to the right of the upper crankshaft end 84, is a horizontally disposed finned cylinder 94 having an ignition module 96 secured to an underside portion thereof. A spark plug 98 is threaded into an opening formed in the right end of the cylinder, the spark plug projecting outwardly through a small opening 100 formed in the front side of the shroud 18. The interior of the cylinder 94 communicates with the interior of a vertically disposed crankcase 102 secured to the left end of the cylinder, the upper crankshaft end portion 84 being disposed within the crankcase as illustrated.

A muffler 104 is suitably secured to the upper side of the cylinder 94 and has an inlet portion 106 communicating with an upper side wall opening 108 in cylinder for receiving hot exhaust gas discharged therefrom. The muffler 104 also has a hot gas discharge end 110 which projects forwardly through an opening 112 formed through the front side of the engine shroud 18 directly behind a forwardly projecting, open grid-type muffler guard 114 secured to the front side of the shroud. Accordingly, during engine operation, hot exhaust gas 116 is forwardly discharged through the grid openings 118 in the front side wall of the muffler guard 114.

A piston 120 is slidably disposed within the interior of the cylinder 94 for horizontal reciprocation relative thereto when the air moving device 10 is in a normal operating position thereof. The right end of a connecting rod 122 is secured to the piston, while the left end of the connecting rod rotatably receives the upper end of a crank pin 124. The bottom end of the crank pin 124 is rotatably received in a counterweight member 126 which is press-fitted onto the upper end of the crankshaft 82.

The upper end portion of the cantilevered crankshaft 82 is rotatably supported within the crankcase 102 by an upper bearing structure 128. Immediately below the upper bearing structure 128, a flywheel 130 is coaxially anchored to the crankshaft for driven rotation thereby. As illustrated, the flywheel 130 has formed thereon a circumferentially spaced series of centrifugal impeller cooling blades 132.

A lower portion of the crankshaft 82, directly beneath the flywheel 130, is circumscribed by a starter pulley portion 134 of the engine's recoil type starting system, the pulley 134 having operatively associated therewith a rewind spring element 136. A starter pull rope 138 has an outer end portion that extends outwardly through a grommeted opening 140 in the back side of the shroud 18 and is secured to a suitable pull rope handle 142 positioned exteriorly of the engine shroud.

Figure 6:
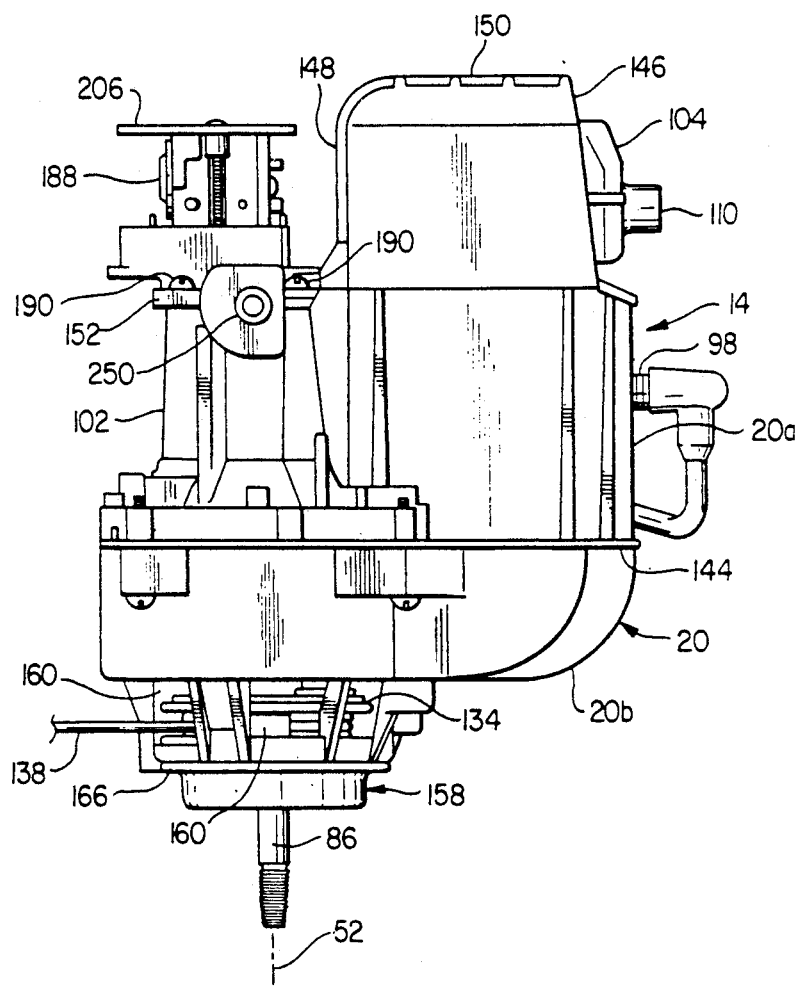
FIG. 6 is an enlarged scale side elevational view of the power head assembly with gas tank, handle, outer engine shroud, fan impeller and impeller housing portions of the unit removed therefrom for illustrative purposes.

Referring now to FIGS. 2, 3 and 6, the interior fan housing 20 has an upper section 20$_a$ which envelops the cylinder 94 and the muffler 104, and has an open lower end 144, and a front side opening 146, positioned rearwardly of the muffler guard 114, through which a front end portion of the muffler 104 forwardly projects. The upper fan housing section 20$_a$ has an upper rear side wall 148 which is spaced rearwardly from the back end of the muffler, and an upper end wall 150 which is spaced upwardly from the upper side of the muffler. A tab portion 152 of the upper fan housing section 20$_a$ projects rearwardly from the bottom end of its back wall 148 across the upper end of the crankcase 102.

The interior fan housing 20 also has a lower section 20$_b$ having an open upper end portion 154 which is removably secured to the open bottom end 144 of the upper fan housing section 20$_a$ by suitable screws (not illustrated). The lower fan housing section 20$_b$ envelops the ignition module 96, the flywheel 130, a lower axial section of the crankshaft 82, and the starter pulley 134. Depending from the bottom side of the lower fan housing section 20$_b$ is a hollow, stepped hub section 158 having a series of inlet openings 160 formed therethrough as best illustrated in FIG. 6. The hub section 158 has an upper annular portion 162, and a smaller diameter lower annular portion 164, the annular portions 162 and 164 defining therebetween an annular, downwardly facing peripheral shoulder 166.

As best illustrated in FIGS. 2 and 3, the lower axial crankshaft portion 86 extends downwardly through the hub section 158, with the starter pulley 134 being slidably mounted on a support tube portion 168 extending upwardly from the inner periphery of the lower annular portion 164. The pulley 134 is captively retained within the space between the upper annular portion 162 and the tube 168 by a retaining flange member 170 secured to the upper side of the upper annular portion 162 by screws 172.

The lower or cantilevered end portion 86 of the crankshaft 82 is rotatably supported on the fan housing hub section 158 by a bottom bearing structure 174 which includes a cylindrical bushing 176, an elongated tubular spacer member 178, and an annular ball bearing 180 having inner and outer race portions 180$_a$ and 180$_b$ (FIG. 2).

The bushing 176 relatively loosely circumscribes the lower section 86 of the crankshaft 82, and bears at its lower end against the impeller hub 90. The spacer member 178 coaxially circumscribes the lower crankshaft section 86 and bears at its opposite ends against the upper end of the bushing 176 and a central portion of the flywheel 130. The inner bearing race 180$_a$ outwardly circumscribes the bushing 176, and the outer bearing race 180$_b$ is captively retained between an interior ledge portion 182 of the lower annular portion 164 of the housing hub 56, and a series of retaining members 184 removably secured to the bottom side of the lower annular portion 164 by screws 186. The relatively loose fitting bushing 176 acts as a spacer to prevent radial pre-load on the bottom bearing 180 and permits relative axial movement between the crankshaft 82 and the bushing 176.

The engine 14 also includes a carburetor 188 which is spaced rearwardly from the muffler 104 and mounted atop the tab portion 152 of the upper fan housing section 20$_a$ by screws 190 (FIG. 6) extending downwardly through a base portion of the carburetor, through the tab 152, and into the upper end of the crankcase 102. Carburetor 188 is disposed within a well section 192 interiorly depending from the top end wall 194 of the shroud 18. The well section 192 has an open upper end 196, an open lower end 198, and a front side wall 200 which is spaced rearwardly from the upper rear side wall 148 of the upper fan housing section 20$_a$. Importantly, these two wall sections 148 and 200 define a convenient barrier between the muffler 104 and the carburetor 188 which serves to thermally isolate these two engine components from one another.

The open lower end 198 of the well section 192 is interiorly bordered by a lip portion 202 which bears against and slightly compresses a hollow foam rubber thermal and dirt barrier element 204 that circumscribes and outwardly engages a bottom end portion of the carburetor 188. To manually regulate air inflow into the carburetor 188, a metal choke plate 206, having an air inlet opening 208 formed therethrough, is suitably secured to the upper end of the carburetor 188. Air inflow through the opening 208 is regulated by a manual choke lever 210 pivotally secured to the choke plate 206 by a screw 212, and projecting outwardly through a shroud wall opening 214. Pivotal motion of the choke lever 210 adjustably positions an inner end portion 216 thereof over the inlet opening 208 to adjustably regulate air inflow to the carburetor.

A rectangular foam rubber air filter element 218 is positioned atop the choke plate 206 and has a central opening 220 circumscribing the air inlet opening 208, and a series of retaining openings 222 extending downwardly through the upper side of the filter element body. The filter element 218 is retained in place on the choke plate 206 by a cover member 224 releasably latched in place within the open upper end 196 of the shroud well section 192. The cover member 224 has a series of depending pin portions 226 received within the central filter element opening 220 and bearing against its periphery, and a series of depending pin portions 228 which are downwardly received in the filter element retaining openings 222.

During operation of the engine 14, carburetor inlet air 230 is drawn inwardly through the air inlet slots, 24 (FIG. 1) in the shroud, flows upwardly through the shroud interior, passes upwardly through the thermal and dirt barrier element 204 into the interior of the shroud well 192, and flows horizontally through the body of the air filter 218 into the carburetor. Also during engine operation, rotation of the bladed flywheel 130 draws ambient cooling air 232 inwardly through the shroud slots 24 into the shroud interior and then into the interior of the lower fan housing section 20$_b$ through its inlet openings 160 (FIG. 6). The cooling air 232 is then forced upwardly through the interior of the fan housing 20, across the cylinder 94 and the muffler 104, and is then discharged forwardly through the muffler guard slots 118 via the fan housing outlet opening 146. In this manner, the ambient cooling air 232 discharged forwardly from the shroud 18 not only cools the engine 12, but also serves to mix with and cool the hot muffler discharge gas 116 also being forwardly discharged from the engine shroud.

To hold a supply of fuel for the engine 14, a small plastic gas tank 234 is positioned within a rear side portion of the engine shroud 18 directly behind the crankcase 102 and the lower section 20$_b$ of the fan housing 20. The gas tank 234 has a fill neck portion 236 which extends outwardly through, and is captively retained within, a suitable opening 238 formed through the rear side wall of the shroud. A closure cap member 240 is screwed onto an outwardly projecting portion of the neck 236, and a fuel inlet line 242 is interconnected between the carburetor 188 and the interior of the gas tank 234. The body of the gas tank 234 is held in place within the engine shroud by a pair of resilient support members 244 suitably secured to the opposite halves of the engine shroud and bearing against opposite side portions of the body of the tank 234.

The engine 14 is mounted within the shroud 18 by means of a uniquely designed resilient support system which prevents rigid contact between the engine and the shroud 18 or the impeller housing 16, and also permits the engine to resiliently shift relative to the balance of the air moving device 10 when an impact load is imposed upon the impeller 50 as later described.

The resilient support system has an upper portion which includes a pair of hollow support post members 250 (FIGS. 3 and 6) which project horizontally outwardly from opposite sides of the fan housing tab portion 152. Post members 250 are slidably received within cup members 252 formed from a resilient material such as rubber or neoprene and captively retained within outwardly projecting well portions 254 formed in upper sections of the shroud halves 18$_a$ and 18$_b$. The sliding interfit between the support post members 250 and the cup members 252 relatively freely permits the engine 14 to pivot relative to the shroud 18 about an axis 256 which extends through an upper portion of the engine 14 transverse to its drive axis 52. However, the cup members 252 resiliently resist movement of the engine 14 with respect to the shroud 18 in directions parallel to and transverse to the axis 256. For example, as best illustrated in FIG. 3, it can be seen that movement of the upper portion of the engine 14 transverse to the axis 256 is resiliently resisted by side wall portions of the cup members 252, while side-to-side movement of the upper engine portion parallel to axis 256 is resisted by the enterengagement between flange portions 258 of the tab section 152 and the inner ends 260 of the cup members 252.

The lower portion of the resilient support system is associated with a lower end portion of the engine 14 and is defined by an annular support member 252 formed from a resilient material such as rubber or neoprene. The annular support member 262 circumscribes the lower annular portion 164 of the fan housing hub section 158 and is disposed between the ledge portion 58 of the impeller housing central well portion 56 and the shoulder 166 positioned between the upper and lower annular portions 162, 164 of the fan housing hub section 158. The annular support member 262 resilient resists the pivotal motion of the engine 14 about the axis 256, as well as about any other horizontal axis intersecting the vertical axis 52. For example, as viewed in FIG. 2, clockwise pivotal motion of the engine 14 about the axis 256 would be resisted by the compression of a left side portion of the annular support member 262.

By viewing FIGS. 2 and 3, it can readily be seen that no portion of the engine 14 rigidly engages either the shroud 18 or the lower impeller housing 16. Instead, the engine contacts these two housing elements of the air moving device 10 only via the resilient cup members 252 and the resilient lower annular support member 262 which floatingly and resiliently support the engine within the overall air moving device housing structure. Even the gas tank 234 is movable relative to the engine shroud 18. This resilient, floating engine support structure substantially reduces engine operation vibration transmitted to the shroud 18 and the lower impeller housing 16. In turn, this substantially diminishes the normal operator hand and arm fatigue typically caused by engine vibration transmitted from the housing structure to the operator's hand and arm.

The only other place that the engine 14 is connected to the housing structure is at the air filter element 218. However, the resilient structure of the air filter element 218 substantially precludes engine vibration at the carburetor 188 from being transmitted to the upper end wall 194 of the shroud 18. Additionally, deflection of the engine 14 relative to the shroud 18 merely flexes the air filter 218, and does not transmit a rigid engine deflection load to the shroud 18.

The simple resilient support system just described also helps to protect the engine 14, and particularly its crankshaft 82 and its bearing structures 128 and 174, from damage caused by impact upon the impeller 50.

For example, while the lower cover member 66 functions quite efficiently as an anti-entrainment mechanism to inhibit the ingestion within the lower end chamber 48 of ground-disposed objects such as pebbles and the like when the air moving device 10 is in its blower mode, it is still theoretically possible, in limited instances, for an object such as the pebble 264 illustrated in FIG. 2 to be drawn into the impeller housing 16 during engine operation. Such hard object ingestion can also occur, of course, when the device is in its vacuum mode.

The tendency of ingested objects, such as the pebble 264, if sufficiently large, is to in some cases become wedged between the rapidly rotating impeller 50 and the annular portion 266 of the lower section 16$_b$ of the impeller housing 16. Wedging of an object in this manner creates an upwardly and inwardly angled impact force 268 (FIG. 2) on the impeller 50 which is transmitted to the engine via the crankshaft 82 and tends to pivot the engine in a clockwise direction about its pivot axis 256, while at the same time exerting a vertically upward force component on the engine. In engine-driven air moving devices of conventional construction, this sudden impact load can easily damage the crankshaft and/or its associated bearing support structure, and the impeller.

However, in the illustrated air moving device 10 of the present invention, this representative impact load 268 imposed upon the impeller 50 simply causes the engine 14 to pivot relative to the shroud 18 in a clockwise direction (as viewed in FIG. 2) against the resilient resistive force of the lower annular support member 262, and move slightly upwardly against the resilient resistive force of the upper cup members 252, thereby lessening the impact loads borne by the crankshaft 82 and its upper and lower bearing structures 84 and 174.

The impact protection afforded the lower bearing structure 174 is augmented by its placement within the lower annular portion 164 of the fan housing hub section 158 which permits this lower bearing structure to be deflected with the balance of the engine 14. This protective positioning of the lower bearing structure is in sharp contrast to the conventional practice of mounting it on a rigid portion of the overall housing structure, in which case a substantially increased radially load on the bearing structure would be transmitted thereto in response to an impeller impact force such as the representative impact force 268.

The unique configuration and positioning of the lower resilient support member 262 permits the power head assembly 12 to be very quickly and easily removed, in its entirety, from the impeller housing 16 simply by pivoting the bottom cover member 66 (FIG. 2) to its open position, reaching into the interior of the impeller housing, and removing the retaining nut 92 from the bottom end of the crankshaft 82, and then removing the shroud/impeller housing screws 54 (FIG. 1). When this is done, the entire power head assembly 12 may be simply lifted upwardly away from the impeller housing 16, leaving the impeller 50 therein.

When it is desired to reinstall the power head assembly 12, all that is necessary is to position it atop the upper impeller housing section 16$_a$ so that the fan housing hub portion 158, and the lower annular support member 262, drop into the central well portion 56 of the upper impeller housing section 16$_a$, and the crankshaft 82 is again operatively inserted through the impeller hub portion. The shroud 18 is then resecured to the impeller housing 16, using screws 54, and the retaining nut 92 is threaded onto the lower end of crankshaft 82.

The ease with which the power head assembly 12 may be removed from the impeller housing 16 also provides substantially improved access to the starter pulley 134. For example, after the power head assembly is removed as previously described, complete access to the pulley 134 is achieved simply by removing the bottom section 20$_b$ of the interior fan housing 20.

While in the illustrated embodiment of the present invention, the impeller 50 is driven by the internal combustion engine 14, it will readily be appreciated that the resilient support system described above could also be utilized in instances where an electric motor is used to drive the impeller 50. Accordingly, as used herein, the terms "engine", "engine means" and the like are intended to encompass both internal combustion engines and electric motors unless indicated otherwise.

It can be seen from the foregoing that the present invention provides a blower/vacuum air moving device which substantially reduces engine operation vibration transmitted to its housing structure, while at the same time providing a very significant degree of protection to its engine against potentially damaging impact forces transmitted to its rapidly rotating impeller. The resilient support system described above provides these advantages in a very simple and quite inexpensive manner, the upper and lower portions of the resilient support system being quite easy to fabricate and install.

The foregoing detailed description is to be clearly understood as being given by way of illustration and example only, the spirit and scope of the present invention being limited solely by the appended claims.

What is claimed is:

1. Apparatus for rotationally driving a bladed member disposed within a base housing structure having an upper side wall portion with an opening formed therethrough, said apparatus comprising:

an engine shroud having an open lower end;

attachment means for removably securing said open lower end of said engine shroud to said upper side wall portion of said base housing structure over said opening therein;

engine means disposed within said engine shroud and operative to rotationally drive the bladed member, said engine means having a vertical drive axis, and a shaft member extending longitudinally along said vertical drive axis and having a lower power output end portion projecting downwardly from a lower end portion of said engine means and into said base housing structure through said opening in said upper side wall portion thereof;

connection means for removably connecting the bladed member to said lower power output end portion of said shaft member for rotation thereby about said vertical drive axis; and mounting means for resiliently supporting said engine means within said engine shroud in a manner preventing appreciable rigid contact between said engine means and both said engine shroud and the base housing structure to thereby substantially diminish engine means operating vibration transmitted to said engine shroud and the base housing structure, said resilient mounting means including:

a first resilient support means vertically supporting a first section of said engine means on said engine shroud and relatively freely permitting pivotal movement of said engine means with respect to said engine shroud only about a second axis generally transverse to said vertical drive axis, but resiliently resisting any only movements of said first engine means section relative to said engine shroud, and a second resilient support means vertically supporting a second section of said engine means spaced vertically apart from said first section thereof, said second support means resiliently resisting pivotal movement of said engine means with respect to said engine shroud about said second axis.

2. The apparatus of claim 1 wherein:

said first section of said engine means is an upper portion thereof, and said second section of said engine means is a lower portion thereof.

3. The apparatus of claim 2 wherein:

said first resilient support means of said mounting means includes a pair of support post members projecting outwardly from opposite sides of said upper portion of said engine means and coaxially received in a pair of resilient cup members internally carried by said engine shroud, and said second resilient support means of said mounting means includes an annular resilient support member circumscribing said lower portion of said engine means and outwardly bearing against the upper side wall portion of the base housing structure.

4. The apparatus of claim 3 wherein:

said apparatus further comprises a depending well section formed on the upper side wall portion of the base housing structure and circumscribing the opening therein, said engine means include a fan housing having a hub section partially defining said lower portion of said engine means and being received within said depending well section, and said annular resilient support member circumscribes said hub section and bears outwardly against said depending well section.

5. The apparatus of claim 1 wherein:

said engine means comprise an internal combustion engine having a muffler, a fan housing enveloping said muffler and having a wall portion spaced apart from said muffler, and a carburetor spaced apart from said fan housing wall portion, and said engine shroud has an internal wall portion positioned between said carburetor and said fan housing wall portion and defining with said fan housing wall portion a double-walled thermal barrier interposed between said muffler and said carburetor.

6. The apparatus of claim 1 wherein:

said engine means comprise an internal combustion engine having a carburetor and a resilient air filter element interconnected between said carburetor and said engine shroud in a manner permitting said air filter element to flex in response to resilient deflection of said engine means relative to said engine shroud.

7. The apparatus of claim 2 wherein:

a lower end portion of said shaft member is rotationally supported by bearing means carried within said lower portion of said engine means for deflection therewith relative to said engine shroud.

8. A portable, hand-carried, internal combustion engine powered air moving device comprising:

an engine shroud having a top end with a carrying handle secured thereto, and an open bottom end;

an impeller housing having a top end with an opening therein, a bottom end with an air inlet opening therein, and a side wall having an air outlet opening positioned in a front portion thereof;

attachment means for removably securing said open bottom end of said engine shroud to said top end of said impeller housing;

impeller means positioned within said impeller housing and being rotationally drivable to draw air into said impeller housing through said air inlet opening, and discharge the air through said air outlet opening;

an internal combustion engine disposed within said engine shroud, said engine having:
  a rotational drive axis which, with said air moving device in its normal operating orientation, extends generally vertically,
  upper and lower portions spaced apart along said rotational drive axis,
  a rotationally driven shaft member longitudinally extending along said rotational drive axis and having a lower power output end portion projecting downwardly from said lower engine portion into said impeller housing through said opening in said top end thereof, and
  bearing means, positioned within said engine, for rotatably supporting said shaft member;

connection means for removably connecting said impeller means to said lower power output end portion of said shaft member for driven rotation therewith during engine operation; and mounting means for resiliently supporting said engine within said engine shroud in a manner preventing appreciable rigid contact between said engine and said engine shroud or said impeller housing to thereby substantially diminish engine operating vibration, and for permitting said engine to resiliently deflect relative to said engine shroud and said impeller housing in response to an impact between said impeller means, during driven rotation thereof, and an object ingested into said impeller housing, to lessen the possibility of resulting damage to said shaft member or said bearing means, said mounting means having:

a first resilient portion interposed between opposite interior side portions of said engine shroud and opposite sides of said upper engine portion and operative to relatively freely permit pivotal movement of said engine with respect to said engine shroud about a second axis generally transverse to said rotational drive axis, but resiliently resist movement of said engine with respect to said engine shroud in directions parallel to and transverse to said second axis, and a second resilient portion interposed between said lower engine portion and said impeller housing and operative to resiliently resist pivotal movement of said engine with respect to said engine shroud about said second axis.

9. The air moving device of claim 8 wherein:

said engine shroud has a pair of facing interior wall portions formed on opposite upper side portions thereof, said internal combustion engine has a pair of support post members projecting outwardly from opposite sides of said upper portion thereof, said first resilient portion of said mounting means comprises a pair of resilient cup members carried within said interior well portions and coaxially receiving said support post members, said top end of said impeller housing has a generally annular section circumscribing said opening therein and receiving said lower portion of said engine, and said second resilient portion of said mounting means comprise an annular resilient support member circumscribing said lower portion of said engine and radially outwardly bearing against said generally annular section of said top end of said impeller housing.

10. The air moving device of claim 9 wherein:

said engine includes a fan housing which defines said lower portion of said engine.

11. The air moving device of claim 8 wherein:

said internal combustion engine has a carburetor, a muffler spaced apart from said carburetor and enveloped by a fan housing having a wall portion interposed between said muffler and said carburetor, and said engine shroud has an interior wall portion interposed between said carburetor and said fan housing wall portion and defining with said fan housing wall portion a double-walled structure thermally isolating said muffler from said carburetor.

12. The air moving device of claim 8 wherein:

said internal combustion engine has a carburetor, and a resilient air filter element held between said carburetor and an interior portion of said engine shroud in a manner permitting flexure of said air filter element in response to deflection of said internal combustion engine relative to said engine shroud.

13. The air moving device of claim 8 wherein:

said lower portion of said internal combustion engine is defined by a fan housing portion thereof, and said bearing means include a lower bearing structure carried within said fan housing portion for movement therewith relative to said engine shroud and rotatably supporting a lower end portion of said shaft member.

14. A portable, hand-carried air moving device comprising:
a housing structure having a carrying handle secured thereto, an air inlet opening, an an air outlet opening;
an internal combustion engine disposed within said housing structure and resiliently supported therein in a manner preventing appreciable rigid contact between said engine and said housing structure and permitting said engine to be resiliently deflected relative to said housing structure, said engine having a carburetor and a rotationally drivable output shaft;
a fan impeller disposed within said housing structure and secured to said output shaft for rotation thereby to flow air through said housing structure from said air inlet opening to said air outlet opening; and
a resilient air filter element connected between the inlet of said carburetor and an interior portion of said housing structure in a manner causing flexure of said air filter element in response to deflection of said engine relative to said housing structure.

15. The air moving device of claim 14 wherein:
said carburetor has a manually operable choke plate structure positioned over its air inlet,
said housing structure has an access opening therein, and a well section extending inwardly from around said access opening and receiving said carburetor,
said resilient air filter element is positioned against said choke plate structure and has a plurality of openings formed therein, and
said resilient filter element is removably held in place against said choke plate structure by an access plate releasably latched within said access opening and having inwardly projecting retainer portions received in said plurality of openings in said resilient air filter element.

16. The air moving device of claim 15 wherein:
said well section has an open inner end bordered by an inturned lip portion which outwardly circumscribes a base portion of said carburetor, and
said air moving device further comprises a resilient dirt and thermal barrier element circumscribing said carburetor base portion and sealingly engaged around its outer periphery by said inturned lip portion of said well section.

* * * * *